UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 608,727, dated August 9, 1898.

Application filed April 6, 1898. Serial No. 676,639. (No specimens.)

*To all whom it may concern:*

Be it known that I, JOHN H. STEVENS, of the city of Newark, county of Essex, and State of New Jersey, have invented a certain new and useful Pyroxylin Composition of Matter, of which the following is a specification.

Pyroxylin compositions of matter are subject to acid decomposition unless protected by a suitable antacid agent. Such agents are rare. The many forms and applications of pyroxylin compositions require properties which antacid agents often interfere with. Among other properties that of transparency in the products used for lacquers and waterproofing solutions, or solids in imitation of tortoise-shell, amber, and glass, is quite important.

I have invented a new pyroxylin composition of matter which is capable of being used for all purposes to which these compounds are applied and which at the same time is not subject to acid decomposition. In the absence of pigments it is also capable of forming highly transparent effects. This new composition of matter consists of pyroxylin associated with lactamid, either with or without solvents or other substances usually employed in these compounds. The lactamid can be readily combined with all solutions of pyroxylin by reason of its ready solubility in alcoholic solvents. Where acetone solutions are used, as in smokeless-powder manufacture, the lactamid can be introduced in wood-spirit solutions.

In treating pyroxylin which is to be used in a dry state it can be dissolved in water or other liquid which is a non-solvent of the pyroxylin. When closely combined with pyroxylin or its mixtures lactamid, imparts to the pyroxylin or its compounds the property of resisting acid decomposition.

As to proportions, I find that from one per cent. to two per cent., by weight, of the lactamid to the amount of pyroxylin is sufficient. The two per cent. gives the strongest preserving power. Even less than one per cent. can be used with success in cases where the compound is not to be subjected to severe conditions of treatment, such as prolonged or high heat. More than two per cent. can be used, but it is unnecessary and apt to result in a weakening or discoloring of the material as the amount is increased. I do not confine myself to any proportions of the lactamid.

The nature and methods of making pyroxylin and its compounds are well known and require no further description.

Lactamid is well known to chemists as the amid of lactic acid, its chemical formula being $CH_3CH(OH).CO.NH_2$. It is best prepared by acting on the lactic esters with gaseous ammonia. Other methods of production are known, but the above is to be preferred.

Having fully instructed the operator in my invention, what I claim, and desire to secure by Letters Patent, is—

1. A new composition of matter consisting of pyroxylin and lactamid.
2. A new composition of matter consisting of pyroxylin and a solvent of the same associated with lactamid.
3. A new transparent composition of matter containing pyroxylin and lactamid.

JOHN H. STEVENS.

Witnesses:
ABRAHAM MANNERS,
J. W. FAITONTE.